(12) United States Patent
Klein et al.

(10) Patent No.: US 10,163,325 B2
(45) Date of Patent: Dec. 25, 2018

(54) METHODS AND APPARATUS FOR SECURING A SENSOR TO A MONITORED DEVICE

(71) Applicant: W.W. Grainger, Inc., Lake Forest, IL (US)

(72) Inventors: Brice Klein, Chicago, IL (US); Alessia Serafino, Palatine, IL (US); Yashaswini Madhavan, Lake Forest, IL (US); Jerry Shim, Park Ridge, IL (US); Norman Lee, Lake Forest, IL (US); Murtaza Haider, Champaign, IL (US); Lindsay Hai, Lake Forest, IL (US); Mary Pietrowicz, Lake Forest, IL (US); Xiaoyue Chen, Lake Forest, IL (US)

(73) Assignee: W.W. Grainger, Inc., Lake Forest, IL (US)

( * ) Notice: Subject to any disclaimer, the term of this patent is extended or adjusted under 35 U.S.C. 154(b) by 0 days.

(21) Appl. No.: 15/208,820

(22) Filed: Jul. 13, 2016

(65) Prior Publication Data
US 2017/0018165 A1 Jan. 19, 2017

Related U.S. Application Data

(60) Provisional application No. 62/191,925, filed on Jul. 13, 2015, provisional application No. 62/220,738, (Continued)

(51) Int. Cl.
*G08B 21/00* (2006.01)
*G08B 21/18* (2006.01)
(Continued)

(52) U.S. Cl.
CPC ............. *G08B 21/187* (2013.01); *F16B 1/00* (2013.01); *F16M 13/02* (2013.01); *G05B 15/02* (2013.01);
(Continued)

(58) Field of Classification Search
CPC ... F16B 1/00; F16B 2001/0035; F16M 13/02; G05B 15/02; G07C 3/00; G07C 5/0808; G07C 5/085; G08B 21/182; G08B 21/187
(Continued)

(56) References Cited

U.S. PATENT DOCUMENTS 6,297,742 B1 * 10/2001 Canada ................ G01R 31/343
318/490
7,040,286 B2 5/2006 Campbell
(Continued)

FOREIGN PATENT DOCUMENTS

WO 2014/152273 A1 9/2014

OTHER PUBLICATIONS

ISA/US, International Search Report and Written Opinion issued on PCT Application No. US2016/042117, dated Sep. 23, 2016, 19 pages.

*Primary Examiner* — Naomi Small
(74) *Attorney, Agent, or Firm* — Greenberg Traurig, LLP

(57) ABSTRACT

A sensor housing system is used to monitor the lifetime of a motor or other device. A protected housing shields a microprocessor and several sensors. The device communicates to a user information about the health of the motor or other device using thermal, vibrational, or other measurements. The information is compared to a baseline which provides a warning threshold. Once the threshold is passed, the microprocessor can alert the user that the motor or other device is about to fail.

10 Claims, 18 Drawing Sheets

Related U.S. Application Data filed on Sep. 18, 2015, provisional application No. 62/269,703, filed on Dec. 18, 2015, provisional application No. 62/298,796, filed on Feb. 23, 2016, provisional application No. 62/327,861, filed on Apr. 26, 2016, provisional application No. 62/342,046, filed on May 26, 2016.

(51) Int. Cl.
    *G05B 15/02*     (2006.01)
    *F16M 13/02*     (2006.01)
    *F16B 1/00*     (2006.01)
    *G07C 5/08*     (2006.01)

(52) U.S. Cl.
    CPC .......... *G07C 5/085* (2013.01); *G07C 5/0808* (2013.01); *G08B 21/182* (2013.01); *F16B 2001/0035* (2013.01)

(58) Field of Classification Search
    USPC ........................................... 340/679
    See application file for complete search history.

(56) References Cited

U.S. PATENT DOCUMENTS

| | | | |
|---|---|---|---|
| 9,026,336 B2 | 5/2015 | Ziarno | |
| 2003/0042362 A1* | 3/2003 | Ehrick | B64D 13/00 |
| | | | 244/118.5 |
| 2007/0030349 A1* | 2/2007 | Riley | H04N 7/181 |
| | | | 348/143 |
| 2007/0079469 A1 | 4/2007 | Cunningham | |
| 2008/0024940 A1* | 1/2008 | Plunkett | H02H 7/093 |
| | | | 361/25 |
| 2010/0181398 A1* | 7/2010 | Davis | B02C 18/0007 |
| | | | 241/36 |
| 2014/0062111 A1* | 3/2014 | Biggert | B66C 1/44 |
| | | | 294/106 |
| 2014/0263777 A1 | 9/2014 | Anderson, Jr. | |
| 2014/0285132 A1 | 9/2014 | Mast, Jr. | |
| 2014/0375465 A1* | 12/2014 | Fenuccio | G08B 5/36 |
| | | | 340/691.1 |
| 2015/0168268 A1* | 6/2015 | Fish | G05B 23/0235 |
| | | | 374/142 |
| 2015/0313542 A1* | 11/2015 | Goldberg | A61B 5/0205 |
| | | | 600/384 |
| 2016/0325331 A1* | 11/2016 | Gane | B21D 37/16 |

* cited by examiner

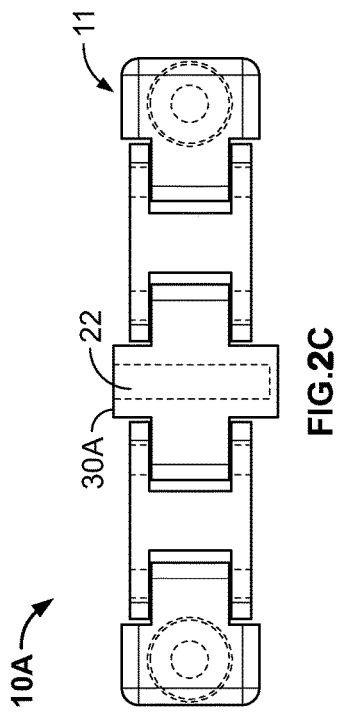
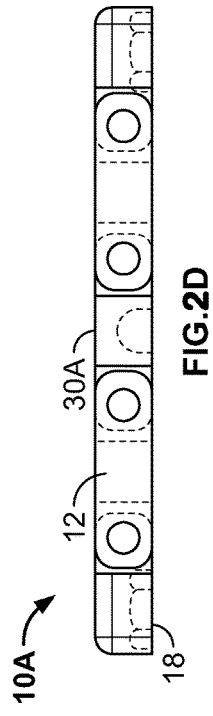
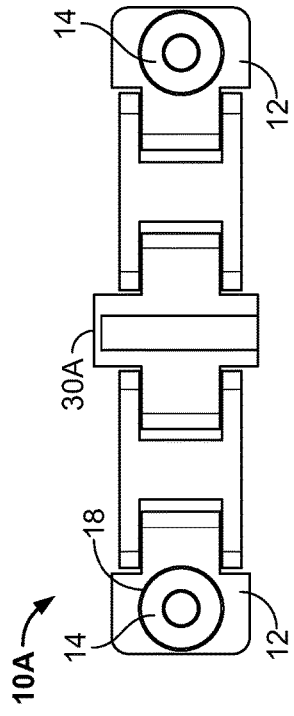
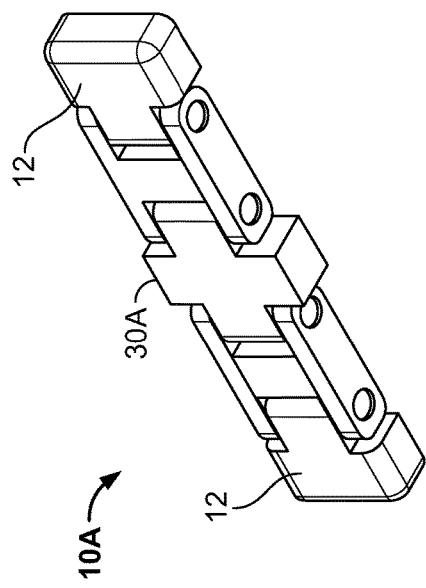
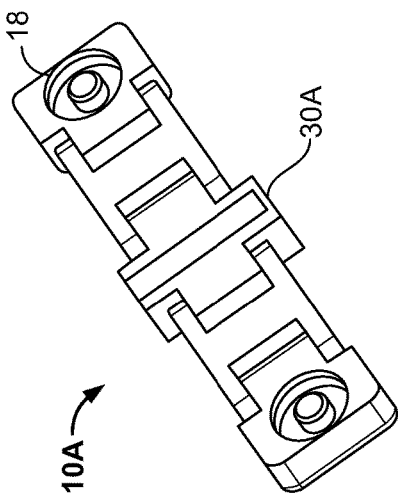

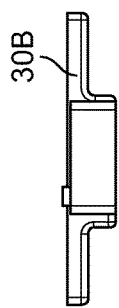
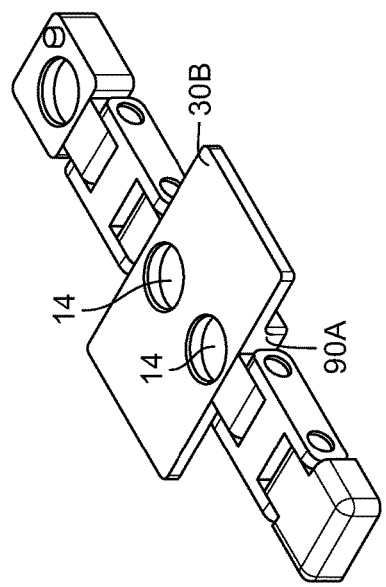
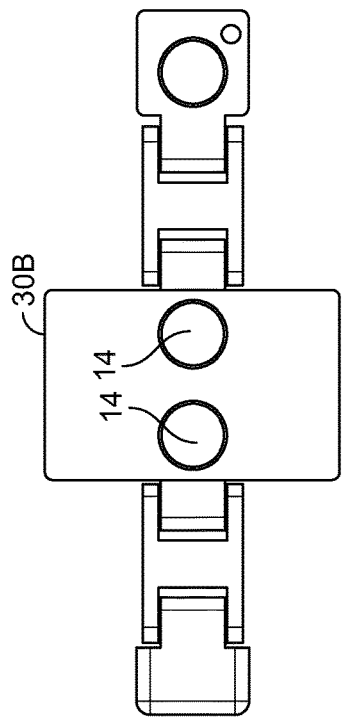
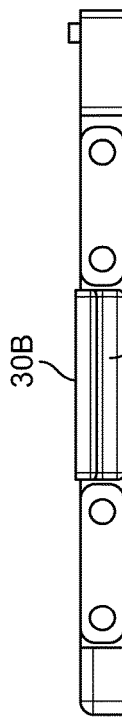
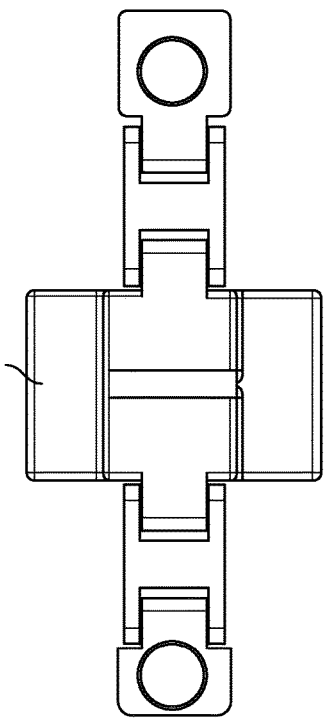

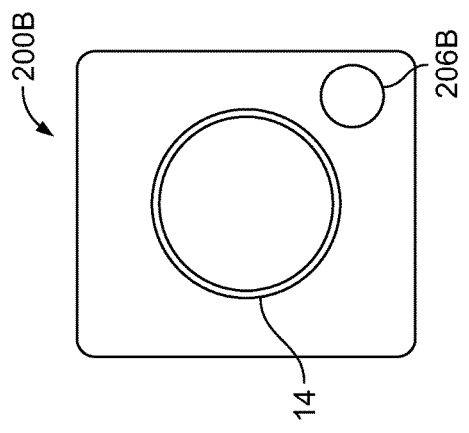
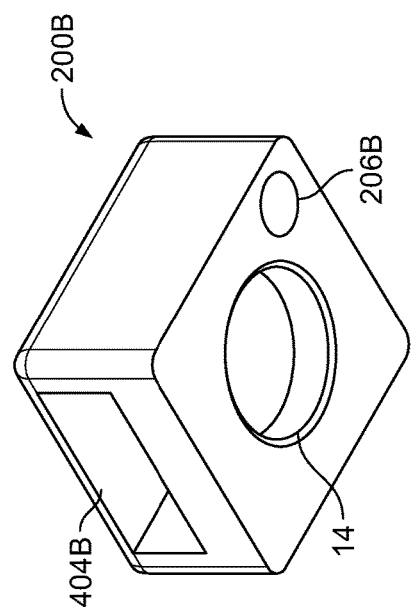
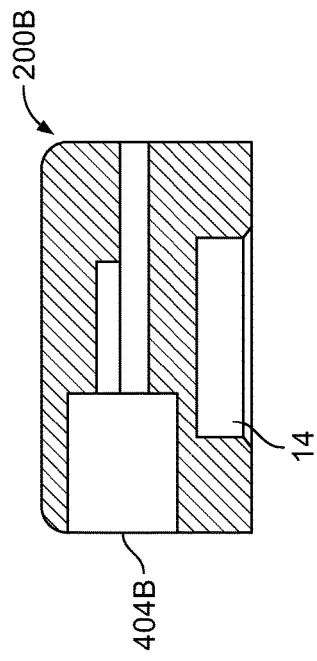
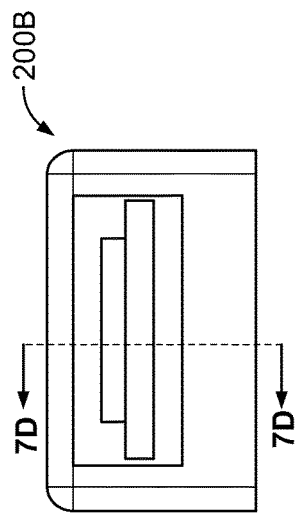
FIG. 7A
FIG. 7B
FIG. 7C
FIG. 7D

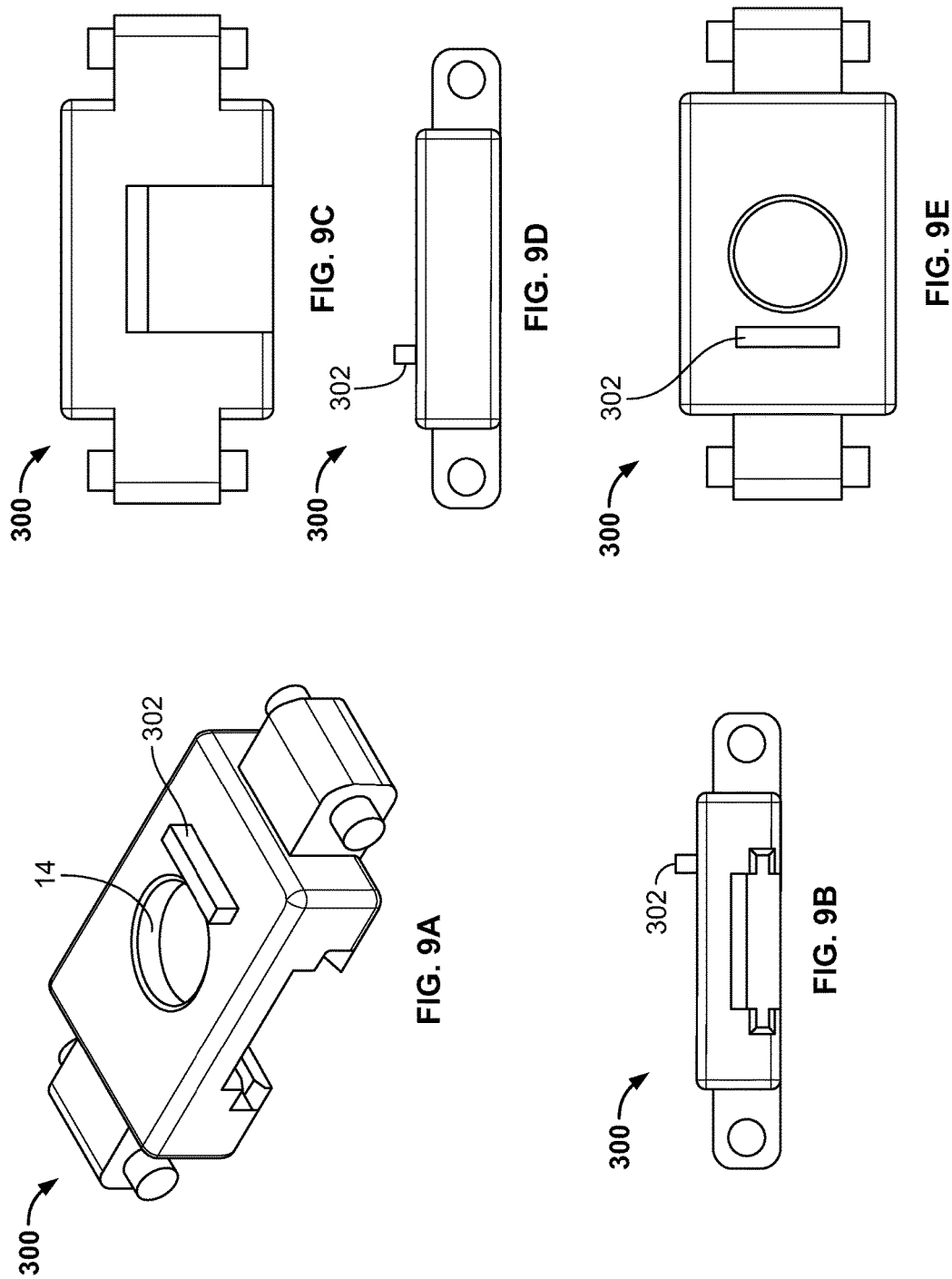

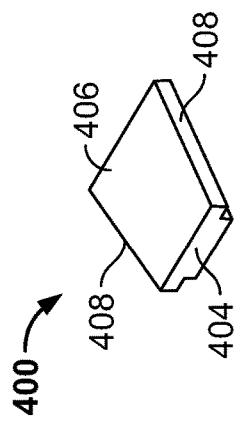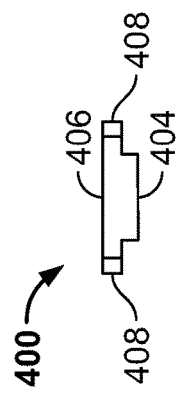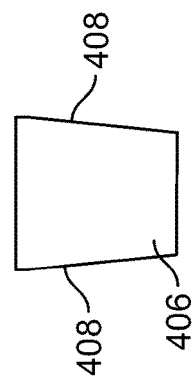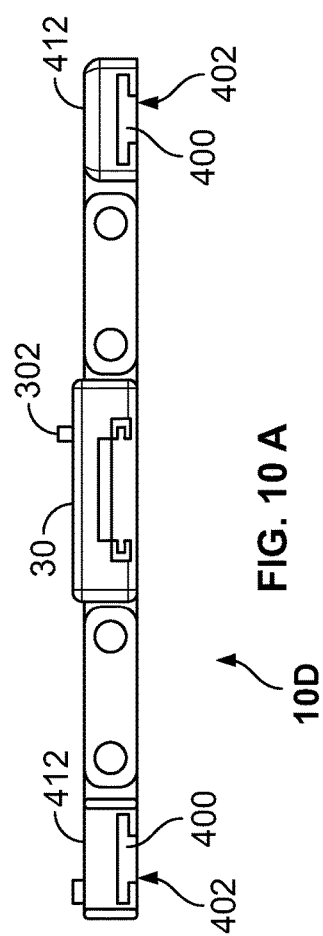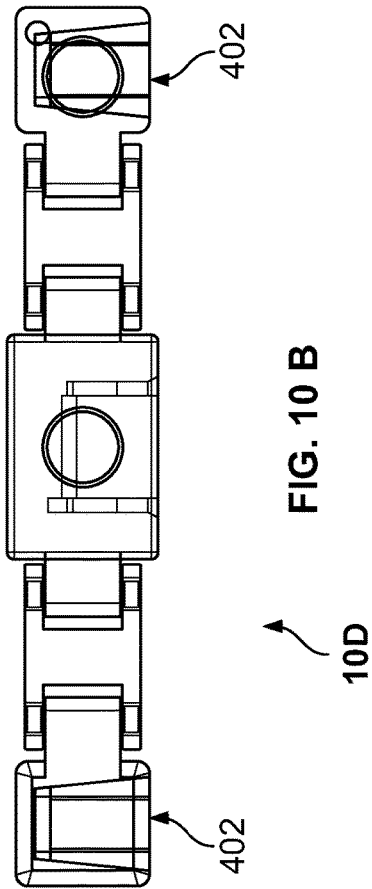

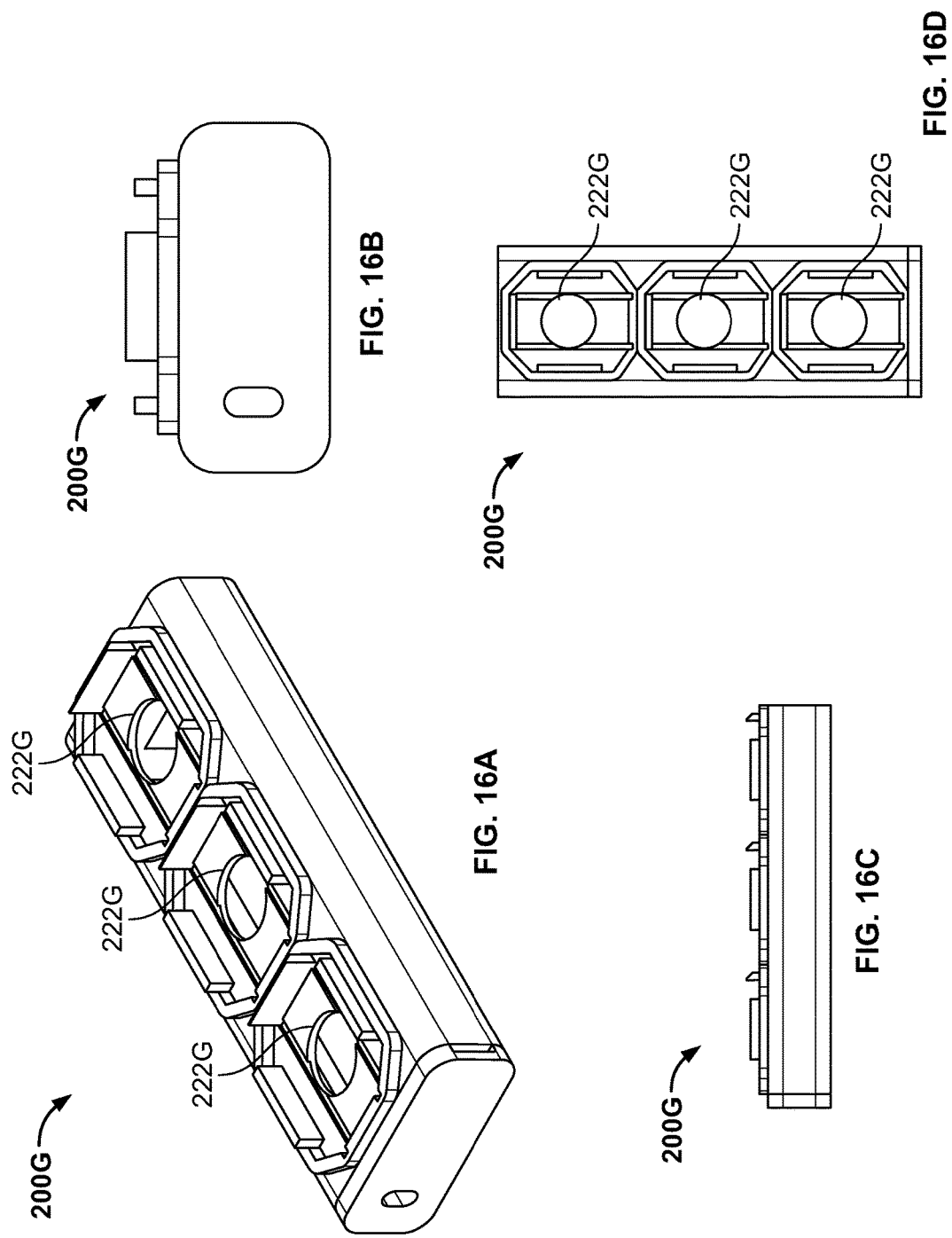

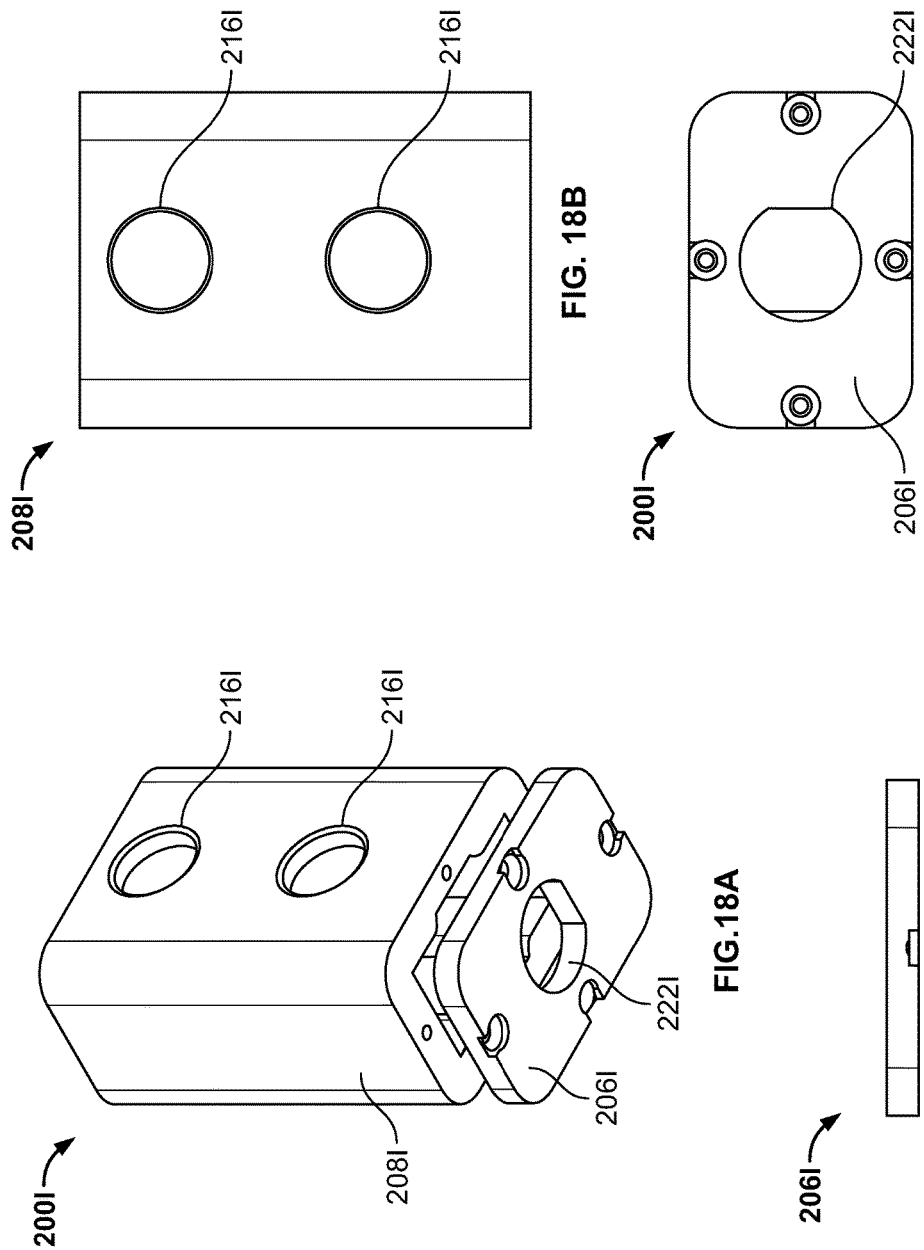

METHODS AND APPARATUS FOR SECURING A SENSOR TO A MONITORED DEVICE

CLAIM OF PRIORITY AND CROSS REFERENCE TO RELATED APPLICATIONS

This application is a non-provisional application claiming priority from U.S. Provisional Application Ser. No. 62/191,925, filed Jul. 13, 2015; from U.S. Provisional Application Ser. No. 62/220,738, filed Sep. 18, 2015; from U.S. Provisional Application Ser. No. 62/269,703, filed Dec. 18, 2015; from U.S. Provisional Application Ser. No. 62/298,796, filed Feb. 23, 2016; from U.S. Provisional Application Ser. No. 62/327,861, filed Apr. 26, 2016; and from U.S. Provisional Application Ser. No. 62/342,046, filed May 26, 2016 each of which is incorporated herein by reference in its entirety.

FIELD OF THE DISCLOSURE

The present description relates generally to sensor mounting and more particularly to various methods and apparatus for securing a sensor to a monitored device.

BACKGROUND OF RELATED ART

Some system components are key to continued product operation or manufacturing processes. When these key components break down, the impact could be expensive, intolerable financial loss to a business, or threat to human safety. Monitoring systems could mitigate the damage from critical component failure by providing automated alerts and triggering mitigating actions. For example, an automated sensing system could detect the failure of a motor in a manufacturing line, send alerts to the key people interested in the failure, switch in a failover system with a working motor, and/or trigger an automated order for a new part. Furthermore, a system that monitors the health of a motor or other key device collects data over time and learns what a failing device looks like. For instance, the monitoring system can detect changes in the health of the device, predict failure before it occurs, discern the cause, automatically recommend mitigating steps, alert people who can take or approve action, or automatically switch in a failover system before failure actually occurs.

While system monitoring of various mechanical components is oftentimes desired, very few known operating components are currently manufactured with built-in monitoring capabilities. Thus, the ability to provide a portable and/or selective monitoring system is beneficial. Still further, in various aging system manufactured and/or installed prior to sensor technology, or in system where the sensors have failed, the ability to retrofit components with monitoring systems is highly desirable.

The secure attachment of such monitoring systems oftentimes presents challenges when one or more sensors are involved, when the device the sensors are monitoring is a metal moving or vibrating part, or when the monitored device operates in a rugged environment. Typically, it is desirable for the attachment mechanism to be secure enough to stay fixed on a device which is moving or vibrating, be rugged enough to withstand physical extremes common in extreme environments or in device failure situations (dirt/oil, corrosive materials, high heat, moisture, vibration/noise, turbulence, electrical current, radiation, etc.), be able to releasably and repeatedly attach to various metal surfaces with ease, be able to attach a variety of sensors to the device (heat, temperature, vibration, current, acceleration, light, pH, gas, pressure, pulse, camera, microphone, etc.) be able to protect the sensors from harm, attach the sensors effectively without damaging or modifying the metallic surface, or potentially voiding the device warranty (no screws, bolts, or adhesives), and/or attach the sensors to a variety of device shapes, including flat surfaces and various curvatures.

One example sensor monitoring device includes a wireless vibration and temperature monitoring device marketed by Banner Engineering in Minneapolis, Minn. The Banner device professes to provide a wireless vibration and temperature monitoring device for use with a variety of machines including motors, pumps, compressors, fans, blowers, and gear boxes. The monitoring device may be mounted to the monitored device through one of a mounting bracket or a magnet housing. As described, the monitoring device provides local indication, sends a signal to a central location, and collects data via a Gateway.

While the above-referenced devices may work for their intended purposes, there is an identifiable need for various methods and apparatus for securing a sensor to a monitored device as recited in the present disclosure.

BRIEF DESCRIPTION OF DRAWINGS

FIG. 2A is perspective view of an example mounting device according to the teachings of this disclosure with solid links.

FIG. 2B is a perspective view of the mounting device of FIG. 2A showing its underside.

FIG. 2C is top view of the mounting device of FIG. 2A.

FIG. 2D is side view of the mounting device of FIG. 2A.

FIG. 2E is bottom view of the mounting device of FIG. 2A.

FIG. 3A is a top view of an example mounting device with a mounting plate.

FIG. 3B is a front side view of the mounting device of FIG. 3A.

FIG. 3C is a bottom view of the mounting device of FIG. 3A.

FIG. 3D is a right side view of the mounting device of FIG. 3A.

FIG. 3E is a perspective view of the mounting device of FIG. 3A.

FIG. 7A is an alternative example sensor housing also shown in FIG. 4A.

FIG. 7B is a bottom view of the alternative sensor housing of FIG. 7A.

FIG. 7C is a front side view of the alternative sensor housing of FIG. 7A.

FIG. 7D is a cross sectional view of the alternative sensor housing of FIG. 7A taken along line 7D-7D in FIG. 7C.

FIG. 9A is a perspective view of a center link of the mounting device shown in FIG. 4F.

FIG. 9B is a front side view of the mounting link of FIG. 9A.

FIG. 9C is a bottom view of the mounting link of FIG. 9A.

FIG. 9D is a back side view of the mounting link of FIG. 9A.

FIG. 9E is a top view of the mounting link of FIG. 9A.

FIG. 10A is a perspective view of the example mounting device first shown in FIG. 4F without the sensor housing.

FIG. 10B is a bottom view of the mounting device of FIG. 10A.

FIG. 11A is a perspective view of the mounting foot for use with the mounting device shown in FIG. 10A.

FIG. 11B is a front side view of the mounting foot of FIG. 11A.

FIG. 11C is a bottom view of the mounting foot of FIG. 11A.

FIG. 16A is a perspective view of another example of the sensor housing.

FIG. 16B is a front side view of the sensor housing of FIG. 16A.

FIG. 16C is a right side view of the sensor housing of FIG. 16A.

FIG. 16D is a top view of the sensor housing of FIG. 16A.

FIG. 18A is a perspective view of another example of the sensor housing.

FIG. 18B is a bottom view of the body of the sensor housing of FIG. 18A.

FIG. 18C is a bottom view of the cover of the sensor housing of FIG. 18A.

FIG. 18D is a front side view of the cover of the sensor housing of FIG. 18A.

DETAILED DESCRIPTION

The following description of example methods and apparatus is not intended to limit the scope of the description to the precise form or forms detailed herein. Instead, the following description is intended to be illustrative so that others may follow its teachings.

One example of a mounting device 10A is illustrated in FIG. 2A-2E, one use of the example device 10A is as follows. The device 10A includes at least one sensor connected to an internal or external specialized computing device with a memory. In some versions, the device 10A communicates with an external computer via a wired or wireless connection. In others, the device contains a protected microcontroller of its own. This mounting device 10A is used to monitor the sensors' data output regarding another device, such as a motor (not shown), in order to communicate the results to a user. This data can be delivered either live through a specialized display device or saved for later review on the computing device's memory.

This device 10A can be used either by the device manufacturer to generate specifications or on site to develop the baseline using the included sensors. The baseline can be prepared from the other models of the motor or approximated with operating data from other similar devices by size, power, torque, or other features. With this baseline, this allows the user to set custom or universal threshold conditions that can alert a user to the impending failure of their motor or other device. Performance data is collected and used to generate information on the failure states of an individual monitored model of the motor which provides different results for normal operation and warning signs of impending failure. Current performance data is compared to historical performance data and prepared baseline performance data of this motor or other device. Quick changes in readings, deviations from normal operating parameters, and known levels which cause problems can be used as thresholds for each sensor reading. When these thresholds are reached the microprocessor can use its transceiver or a wired connection to alert a user or other device by executing a preset command. A user can customize the microprocessor to use its transceiver to communicate to a variety of devices such as a motor controller, a remote display, or an external personal computer. One example use of this would be a failsafe system where the motor controller is sent a signal to shut down if its temperature threshold is reached. These thresholds and triggered alerts or signals can be modified by the user in order to make his system behave appropriately to the local conditions.

Figure 1:
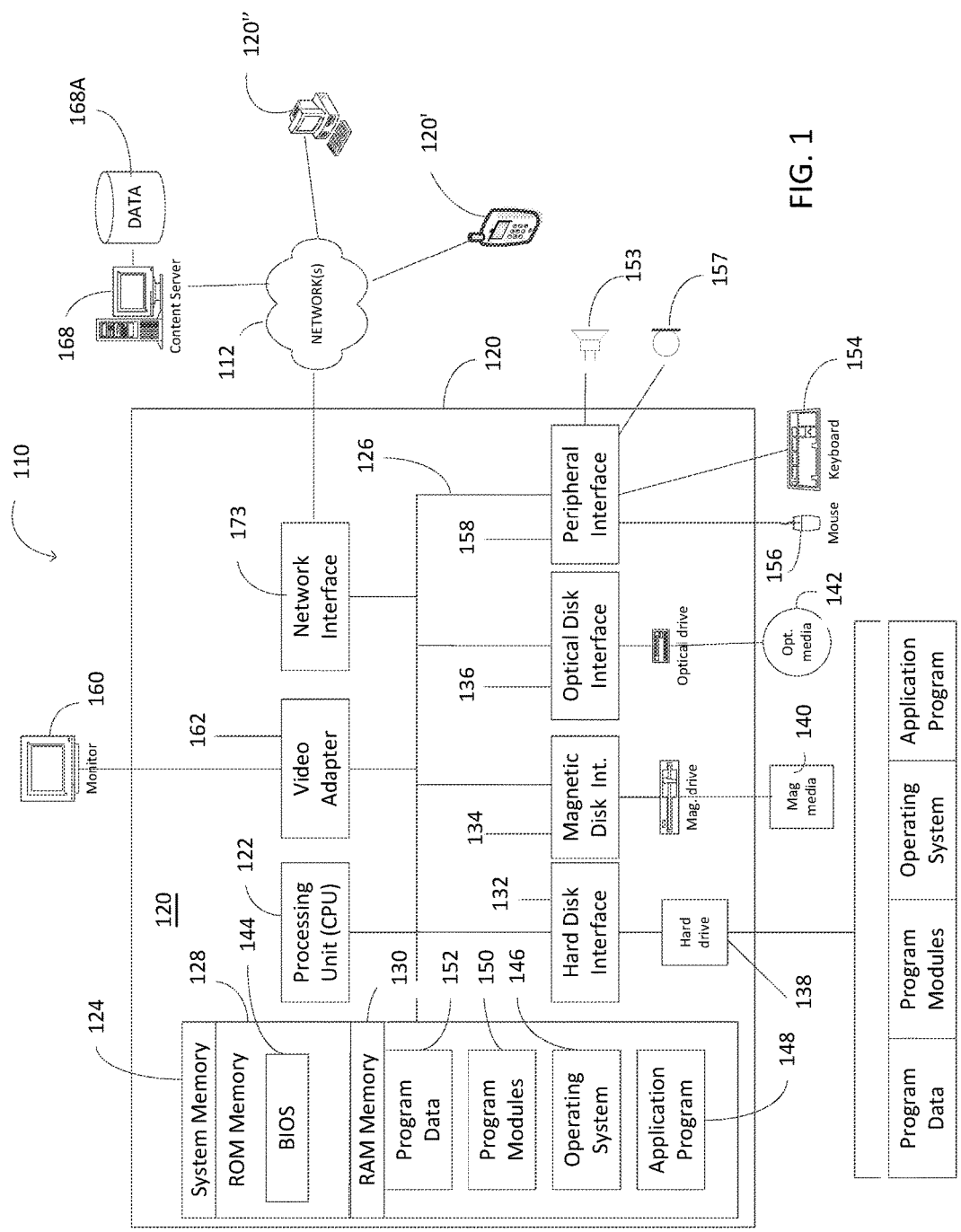
FIG. 1 illustrates in block diagram form components of an example computer network environment suitable for implementing the example methods and systems disclosed.

With reference to the figures, and more particularly, with reference to FIG. 1, the following discloses an example system 110 as well as other example systems and methods for providing monitoring (e.g. classification, assessment, diagnosis, etc.) of motors or other devices on a networked and/or standalone computer, such as a personal computer, tablet, or mobile device. To this end, a processing device 120", illustrated in the exemplary form of a mobile communication device, a processing device 120', illustrated in the exemplary form of a computer system, and a processing device 120 illustrated in schematic form, are provided with executable instructions to, for example, provide a means for a user, e.g., an operator, mechanic, technician, etc., to access a host system server 168 and, among other things, be connected to a hosted location, e.g., a website, mobile application, central application, data repository, etc.

Generally, the computer executable instructions reside in program modules which may include routines, programs, objects, components, data structures, etc. that perform particular tasks or implement particular abstract data types. Accordingly, those of ordinary skill in the art will appreciate that the processing devices 120, 120', 120" illustrated in FIG. 1 may be embodied in any device having the ability to execute instructions such as, by way of example, a personal computer, a mainframe computer, a personal-digital assistant ("PDA"), a cellular telephone, a mobile device, a tablet, an e-reader, or the like. Furthermore, while described and illustrated in the context of a single processing device 120, 120', 120" those of ordinary skill in the art will also appreciate that the various tasks described hereinafter may be practiced in a distributed environment having multiple processing devices linked via a local or wide-area network whereby the executable instructions may be associated with and/or executed by one or more of multiple processing devices.

For performing the various tasks in accordance with the executable instructions, the example processing device 120 includes a processing unit 122 and a system memory 124 which may be linked via a bus 126. Without limitation, the bus 126 may be a memory bus, a peripheral bus, and/or a local bus using any of a variety of bus architectures. As needed for any particular purpose, the system memory 124 may include read only memory (ROM) 128 and/or random access memory (RAM) 130. Additional memory devices may also be made accessible to the processing device 120 by means of, for example, a hard disk drive interface 132, a magnetic disk drive interface 134, and/or an optical disk drive interface 136. As will be understood, these devices, which would be linked to the system bus 126, respectively allow for reading from and writing to a hard disk 38, reading from or writing to a removable magnetic disk 140, and for reading from or writing to a removable optical disk 142, such as a CD/DVD ROM or other optical media. The drive interfaces and their associated computer-readable media allow for the nonvolatile storage of computer-readable instructions, data structures, program modules, and other data for the processing device 120. Those of ordinary skill in the art will further appreciate that other types of non-transitory computer-readable media that can store data and/or instructions may be used for this same purpose. Examples of such media devices include, but are not limited to, magnetic cassettes, flash memory cards, digital videodisks, Bernoulli cartridges, random access memories, nano-drives, memory sticks, cloud based storage devices, and other read/write and/or read-only memories.

A number of program modules may be stored in one or more of the memory/media devices. For example, a basic input/output system (BIOS) 144, containing the basic routines that help to transfer information between elements within the processing device 120, such as during start-up, may be stored in ROM 128. Similarly, the RAM 130, hard drive 138, and/or peripheral memory devices may be used to store computer executable instructions comprising an operating system 146, one or more applications programs 148 (such as a Web browser, mobile application, etc.), other program modules 150, and/or program data 152. Still further, computer-executable instructions may be downloaded to one or more of the computing devices as needed, for example via a network connection.

To allow a user to enter commands and information into the processing device 120, input devices such as a keyboard 154, a pointing device 156 are provided. In addition, allow a user to enter and/or record sounds into the processing device 120, the input device may be a microphone 157 or other suitable device. Still further, while not illustrated, other input devices may include a joystick, a game pad, a scanner, a camera, touchpad, touch screen, motion sensor, etc. These and other input devices would typically be connected to the processing unit 22 by means of an interface 158 which, in turn, would be coupled to the bus 26. Input devices may be connected to the processor 122 using interfaces such as, for example, a parallel port, game port, firewire, a universal serial bus (USB), etc. To view information from the processing device 120, a monitor 160 or other type of display device may also be connected to the bus 126 via an interface, such as a video adapter 162. In addition to the monitor 160, the processing device 120 may also include other peripheral output devices, such as, for example, speakers 153, cameras, printers, or other suitable device.

As noted, the processing device 120 may also utilize logical connections to one or more remote processing devices, such as the host system server 168 having associated data repository 168A. The example data repository 168A may include any data on the monitored device including, for example, model identity and specifications, previous or live performance data, expected failure states, compiled baseline information etc. In this example, the data repository 168A includes a repository of at least one of specific or general performance data related to device functioning. For instance, the repository may include performance data on a motor and an aggregation of such recordings as desired.

In this regard, while the host system server 168 has been illustrated in the exemplary form of a computer, it will be appreciated that the host system server 168 may, like processing device 120, be any type of device having processing capabilities. Again, it will be appreciated that the host system server 168 need not be implemented as a single device but may be implemented in a manner such that the tasks performed by the host system server 168 are distributed amongst a plurality of processing devices/databases located at different geographical locations and linked through a communication network. Additionally, the host system server 168 may have logical connections to other third party systems via a network 112, such as, for example, the Internet, LAN, MAN, WAN, cellular network, cloud network, enterprise network, virtual private network, wired and/or wireless network, or other suitable network, and via such connections, will be associated with data repositories that are associated with such other third party systems. Such third party systems may include, without limitation technology departments, factory central servers, additional data repositories, etc.

For performing tasks as needed, the host system server 168 may include many or all of the elements described above relative to the processing device 120. In addition, the host system server 68 would generally include executable instructions for, among other things, initiating a data collection process, an analysis regarding the detection and/or assessment of a performance data, threshold comparisons for alerts to users, etc.

Communications between the processing device 120 and the host system server 68 may be exchanged via a further processing device, such as a network router (not shown), that is responsible for network routing. Communications with the network router may be performed via a network interface component 173. Thus, within such a networked environment, e.g., the Internet, World Wide Web, LAN, cloud, or other like type of wired or wireless network, it will be appreciated that program modules depicted relative to the processing device 120, or portions thereof, may be stored in the non-transitory memory storage device(s) of the host system server 68.

Referring now to the figures, in one example, shown in FIGS. 2A-2E, the disclosed mounting device 10A includes an elongated band 11 formed from a series of jointed, heat resistant rigid links 12, with at least one attachment mechanism, such as a rare earth magnet 14 mounted to or within at least one of the links 12. In this illustrated example, a pair of magnets 14 are mounted within groove 18 formed within an underside of respective end links 12. A sensor 20 may be mounted in a sensor groove 22, which in this example is formed transverse to the longitudinal axis A of the band 11. In this example, the sensor is connected to an external computing device.

Figure 2F:
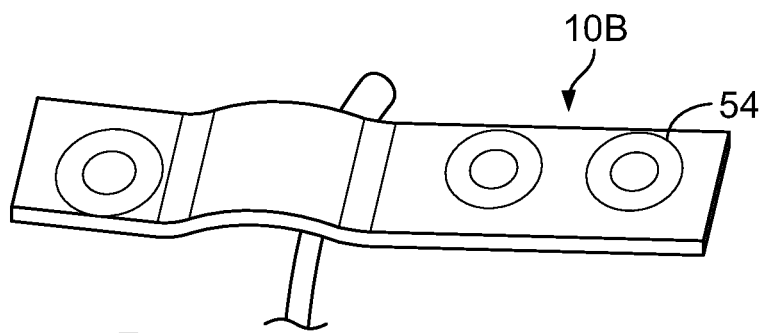
FIG. 2F shows a perspective view of an example mounting device with a woven band.
Figure 2G:
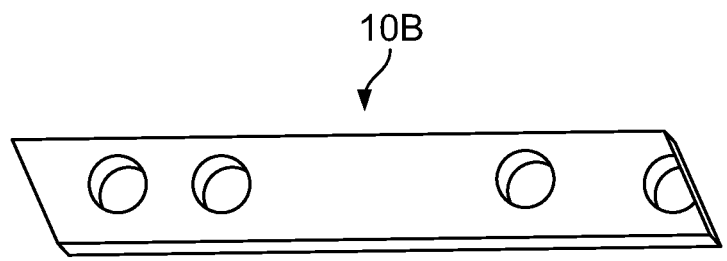
FIG. 2G illustrates another example mounting device with a woven band.
Figure 2H:
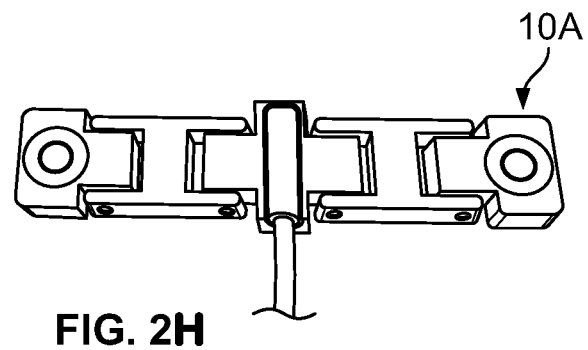
FIG. 2H is a perspective view of the underside of a mounting device shown in FIG. 2A with a sensor installed.

Referring to FIGS. 2F-2H, another example of the presently disclosed mounting device 10B is disclosed. In this example, the device 10B includes an elongated band 52, such as, for example, a flexible KEVLAR® strip. It will be appreciated by one of ordinary skill in the art that the elongated band 52 may be constructed of any suitable material, taking into account the operating environment of the motor and/or device being monitored. For instance, the band 52 may require fire-resistance and durability properties found in various materials such as an aramid material. Similar to the device 10B, in the illustrated example, the device 10B includes a least one adhesive mechanism, such as for instance a rare earth magnet 14. In this example, the magnet 14 is mounted to the surface of the band 52, such as for instance, via sewing, adhering, or other suitable method of mounting the magnet to the band 52.

In the example illustrated in FIG. 2F, the elongated band 52 of the device 10B includes at least one brace 56, or other suitable semi-rigid insert to provide at least some rigidity to the flexible band 52. For instance, as illustrated, the braces 56 are attached to, e.g., via sewing onto, the top, bottom, or integrally formed with or otherwise attached to the band 52 to prevent the magnets 14 from coming together due to device vibration, motion, and/or installation, and assist with allowing the band 52 to remain flush with the device to which it is attached.

Still further, as illustrated in FIG. 2G, at least one side, in this instance the underside, of the band 52 may include a sparse mesh 60 of any suitable material including a mesh of thin Kevlar loops suitable for securing a flat strip sensor to the underside of the Kevlar strip. This mesh 60 may, among other things, enable relatively easy insertion of a variety of sensor strips into the band 52, and/or convenient positioning of any sensor 20 prior to the application of the band 52 to the device being monitored. The strength of the magnets 14 keeps any sensor 20 placed on the band 52 between the magnets 14 in contact with the surface of the device to be monitored.

In the case of the rigid link form 10, the links 12 may alternate between links which house rare earth magnets 14, and links which house sensors 20. FIG. 2H illustrates one example of the band 10A as mounted or otherwise attached to a motor for monitoring.

With regard to the band 52, and as noted above a KEVLAR® or similar material may be utilized. As desired, the material may include any combination of strength, weight, flexibility, heat resistance, flame resistance, cold tolerance, chemical resistance, and/or water resistance as desired. For instance, with regard to a KEVLAR® material, it will be observed that the material is a plastic which can stop bullets and knives. It is resistant to sharp objects which may be present in a rugged manufacturing environment. Tensile strength (stretching or pulling strength) is eight times that of steel wire. The material is lightweight. The material is flexible, allowing it to conform to many different devices shapes and form factors. It is heat resistance and doesn't melt; rather it decomposes at approximately 450 C (850 F). The material is flame resistant in that it will burn when ignited but stops when heat source is removed. The material is Cold Tolerant, down to approximately −196 C, such that low temperatures do not cause it to degrade or become brittle. It is chemical Resistant in that typically, only long-term exposure to strong acids or bases will make it degrade over time, and finally, it is water resistant. As noted above, any suitable material may be utilized by one of ordinary skill in the art including, for example, NOMEX, other plastics, rigid forms, Nylon, and linked rigid forms.

One disadvantage of prior art systems, which rely upon a single magnet or attachment device to attach the sensors to a monitored device, is that the housing is either so rigid that it has to be manufactured to fit the shape of the device being monitored, which limits its use. Other mounting methods, such as semi-rigid mounting devices (e.g., thin metal strip) can bend, but then can buckle and deform when it is removed from the device (which would occur when replacing a broken sensor, adding another sensor, or servicing the device). Semi-rigid forms could also deform if the device vibrates excessively, as it might if the device were failing. If the metal strip buckles or deforms, it can no longer hold a sensor lead flush with the device which it is monitoring.

As contemplated by the present invention, links of rigid forms may be a viable alternative as well. If the links are the right size, they can conform to almost any device shape which would be monitored. The links themselves should preferably also be made of strong, heat-tolerant material. Note that in the disclosed examples, the links are manufactured specifically to house the magnets we select, and also the specific sensors which monitor the devices as well, but other manufacturing selections may be utilized. In the example illustrated in FIGS. 1A-1D, the links 12 form a chain of alternating magnets and sensors, so that to add another sensor, the chain is simply extended to include one more sensor (housed in a link), and one more magnet (also housed in another link).

In the present disclosure, the bands of devices 10A and 10B utilize rare earth magnets 14. These magnets may be utilized because they are the stronger than ferrous magnets. In the present illustrations, the magnets 14 are Neodymium ring and disc magnets.

It will be appreciated by one of ordinary skill in the art that there are multiple alternative configurations for attaching the sensors 20 to the monitored device. For instance, in one example, disk magnets can be inserted into pockets and/or otherwise attached to the bands 10A, 10B as desired. For instance, the magnets may be located within pockets formed in the straps. While this may be secure, this mounting arrangement may be less desirable because it puts the strap material between the magnet and the metallic surface, which weakens the magnetic force attaching the strap to the surface, and increases the likelihood that the magnets will move and the strip will buckle.

In another example, the disk magnets may be insertable into grommets 70 which fit around magnets 14, and a "cap" magnet, which may sit on top of the rare earth magnet to prevent the strap from slipping. Alternatively, T-shaped rare earth magnets 76 may fit inside the grommets 70, (see FIGS. 2A-2B). In the rigid link configuration, links of magnets alternate with links of sensors. The magnet link design provides custom housing for the magnets, as shown in FIGS. 2A-2C. The sensors would communicate to a transmitter through external leads, such as for instance through wires and/or wireless communications.

Referring to FIGS. 2F-2H, another example of the mounting device 10A is illustrated. In this example, the device 10A includes the elongated band 11 of FIG. 2A. As illustrated, however, at least one of the links 12 is modified to include a mounting link 10C. As with FIG. 2A, the mounting link 10C may include a sensor groove 22 for accepting a sensor 20 there within. In addition, the mounting link 10C may include a mounting plate 30B including at least one attachment mechanism, such as for example magnets 14, to allow a housing 200A (see FIG. 5A-6C) to be mounted to the mounting plate 90A. In this example, the housing 200A is adapted to contain a PCB 202, and/or other sensor arrangement to provide the desired sensing capabilities to monitor the device internally.

As shown in FIGS. 2F-2H, the housing 200A may be releasable mounted to the band 11. It will be appreciated by one of ordinary skill in the art that the housing may include antenna, batteries, circuitry, terminal connectors, etc. to provide communication and sensing capabilities desired. In the current example, the polarities and/or arrangement of the magnets 14 arranged on the mounting plate 90B may be oriented and/or spaced such that the housing 200A only mounts in one specific orientation and/or multiple acceptable orientations. In this manner, the device 10A may control the setup of the sensor package as desired.

Figure 6B:
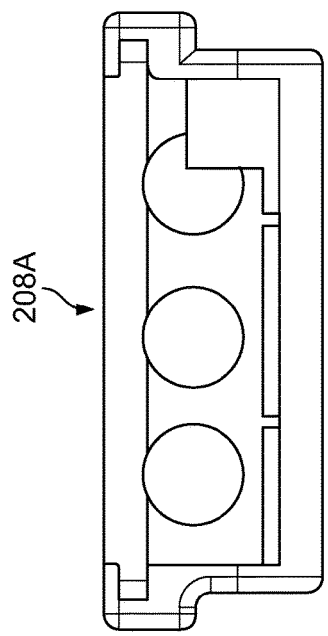
FIG. 6B is a front side view of the body of FIG. 6A.
Figure 6C:
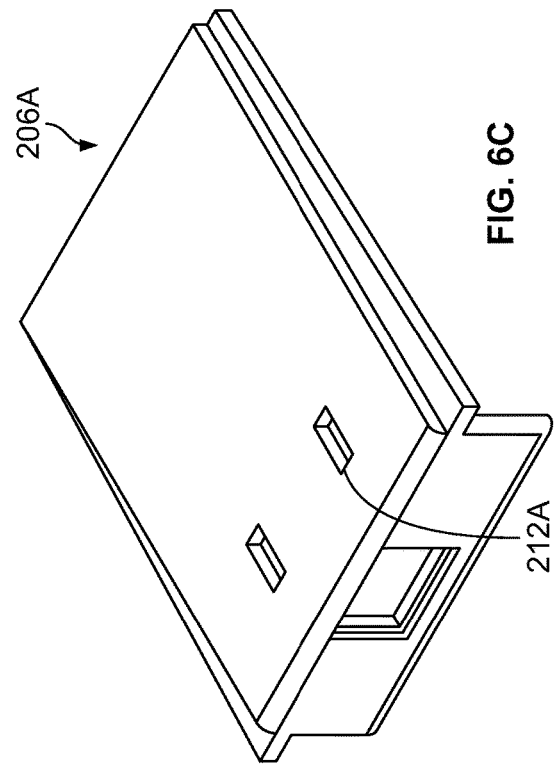
FIG. 6C is a perspective view of the cover of the sensor housing of FIG. 5A.
Figure 6A:
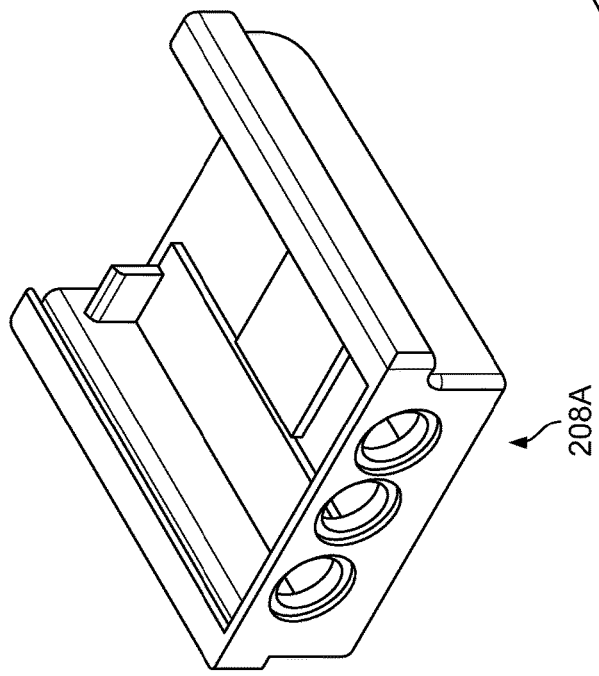
FIG. 6A is a perspective view of the body of the sensor housing of FIG. 5A.

The sensor can be combined or protected in a housing with internal electronics. As illustrated in FIGS. 6A-6C, the housing 200A is designed to accommodate the PCB 202 inside the housing that is magnetically attached to a band that itself is magnetically affixed to the motor's casing. The assembled housing is small enough to give it a low-profile aesthetic feature when placed on the motor. The band 11 has been designed to integrate the temperature sensor, such that when attached to the motor, the temperature sensor is flush against the motor's surface. In addition to this compact design, the strap allows a vibration sensor to magnetically attach to the strap, as described below. This design allows a user to install the sensor package with the temperature and vibration sensor on a motor in one step, or place the individual sensors spread out on the surface of the motor.

Figure 4C:
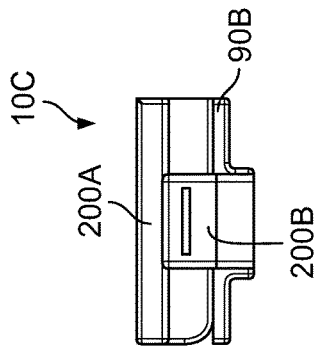
FIG. 4C is a right side view of the mounting device of FIG. 4A.
Figure 4D:
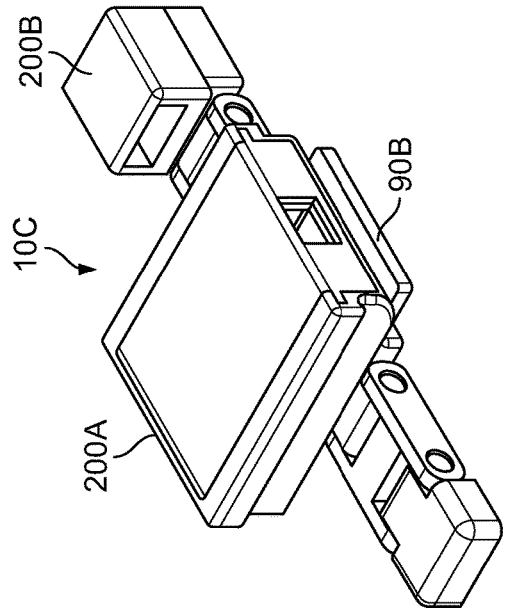
FIG. 4D is a perspective view of the mounting device of FIG. 4A.
Figure 4A:
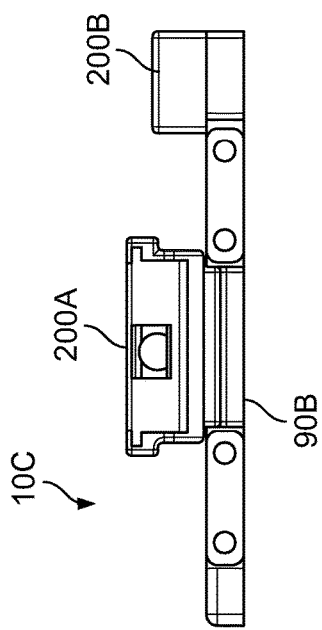
FIG. 4A illustrates a mounting device as shown in FIG. 3A with removable sensor housings attached in a front side view.
Figure 4B:
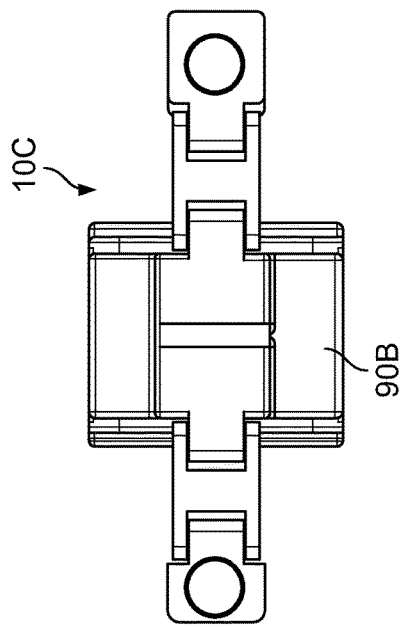
FIG. 4B is a bottom view of the mounting device of FIG. 4A.
Figure 4E:
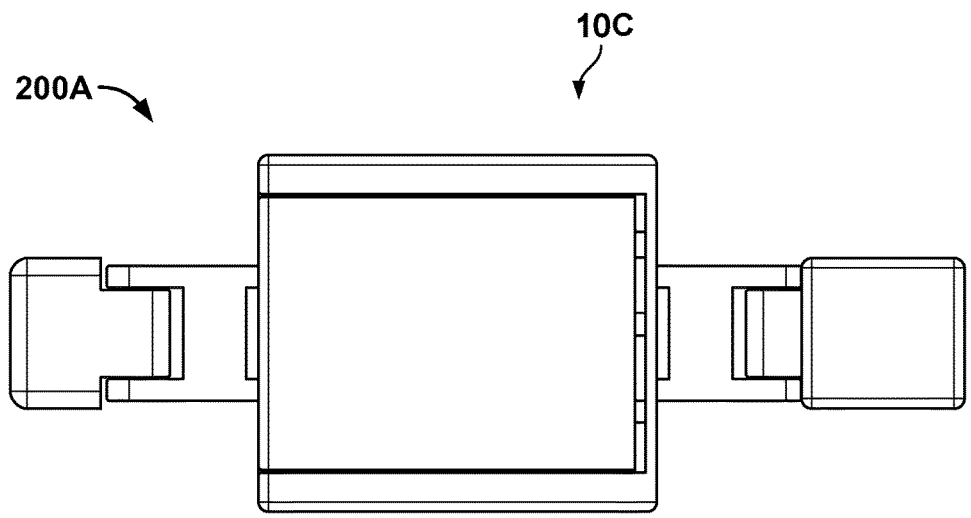
FIG. 4E is a top view of the mounting device of FIG. 4A.
Figure 4F:
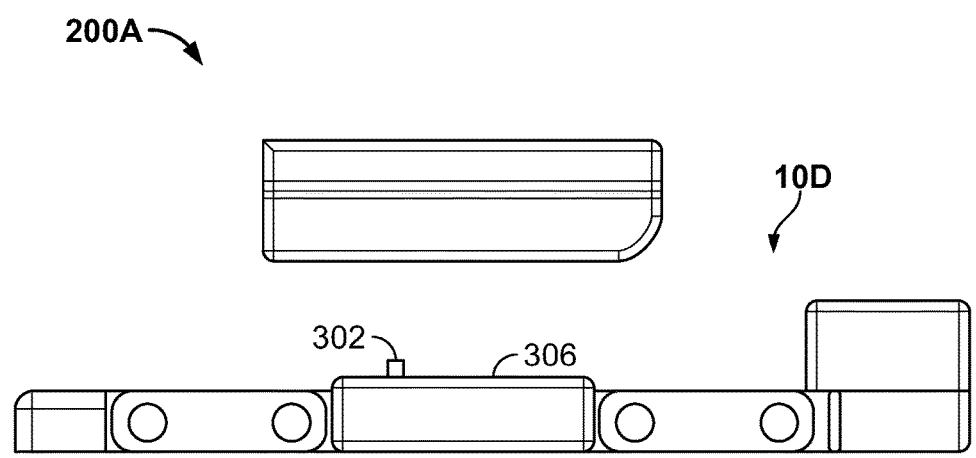
FIG. 4F is a front side view of another version of mounting device showing a different attachment mechanism for the sensor housing.
Figure 5A:
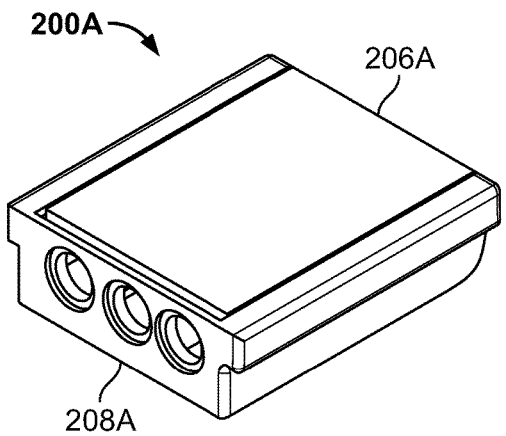
FIG. 5A is a perspective view of the sensor housing shown in FIG. 4A.
Figure 5B:
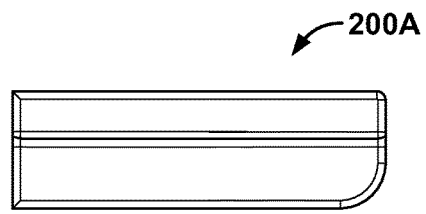
FIG. 5B is a side view of the sensor housing of FIG. 5A.
Figure 5C:
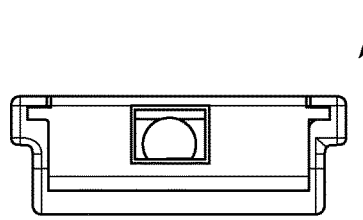
FIG. 5C is a back side view of the sensor housing of FIG. 5A.
Figure 5D:
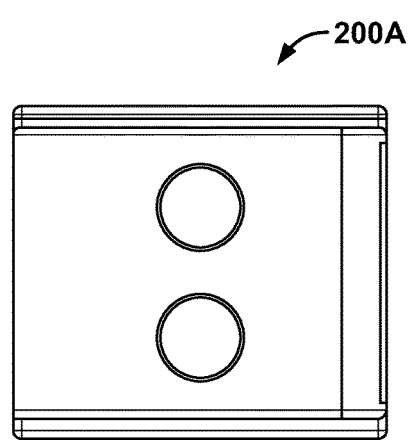
FIG. 5D is a bottom view of the sensor housing of FIG. 5A.

It will be further appreciated by one of ordinary skill in the art that the design of the housing, PCB board, and/or sensing array may vary as desired. For instance, as further illustrated in FIGS. 7A-7D, an alternative sensor housing 200B may be provided to be attached to the band 11. In this example, the sensor housing may be configured to include a simple self-contained sensor, such as for instance a vibration sensor. As will be appreciated, the housing 200B may be optionally attached to the mounting plate 30B, or may be separately attached to the band 11 at any desirable configuration, including in conjunction with the housing 200A, such as illustrated in FIG. 4A.

Figure 8A:
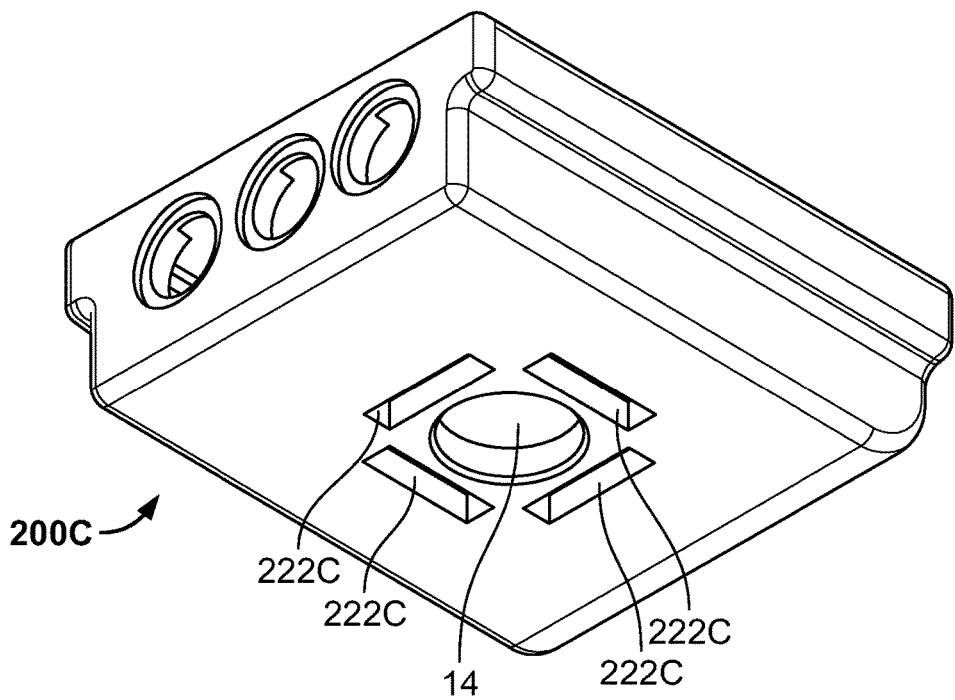
FIG. 8A is a perspective view of another example of the sensor housing showing the attachment and locking mechanism first shown in FIG. 4F.
Figure 8B:
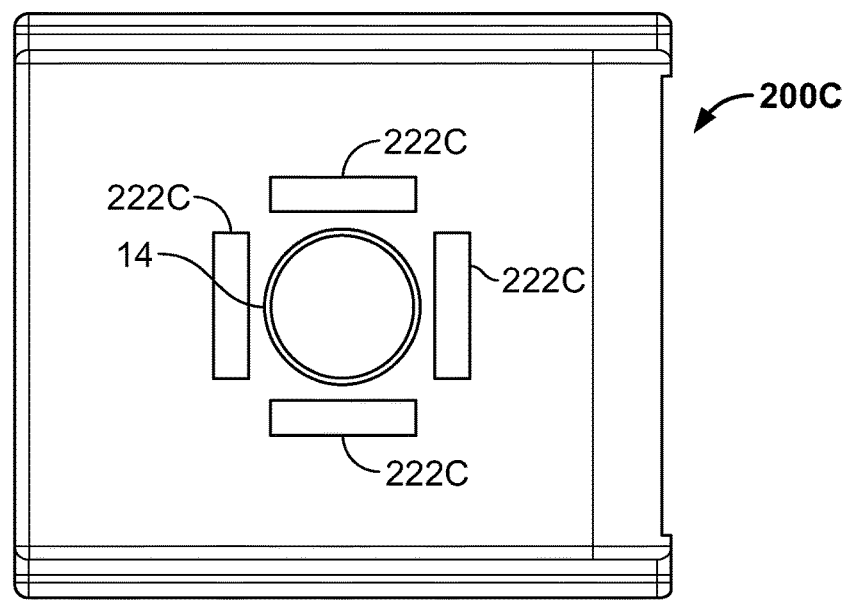
FIG. 8B is a bottom view of the sensor housing of FIG. 8A.
Figure 12A:
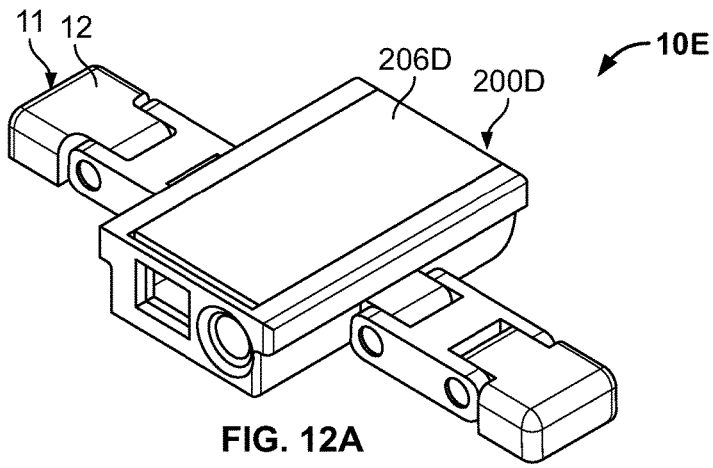
FIG. 12A is another example mounting device with an integrated sensor housing.
Figure 12B:
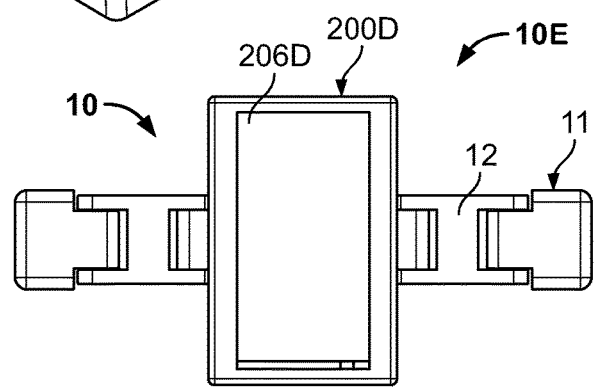
FIG. 12B is a top view of the mounting device of FIG. 12A.
Figure 12C:
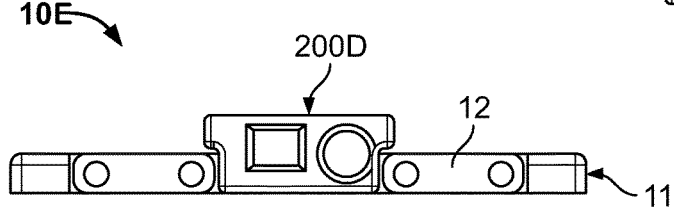
FIG. 12C is a front side view of the mounting device of FIG. 12A.
Figure 12D:
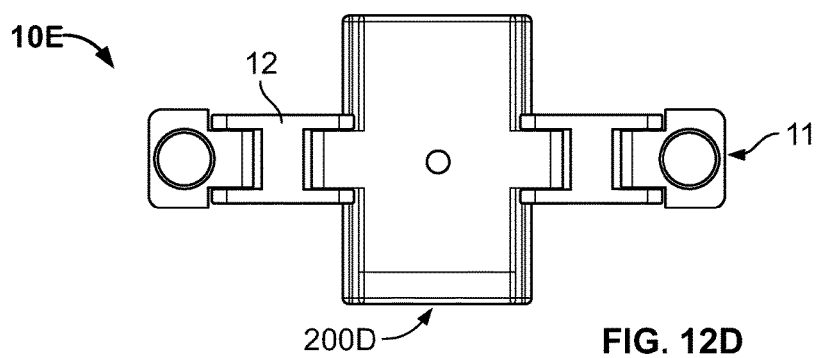
FIG. 12D is a bottom view of the mounting device of FIG. 12A.
Figure 13B:
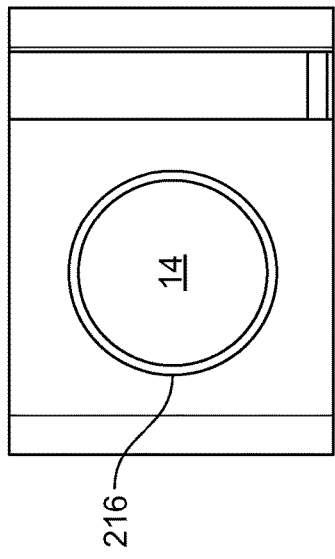
FIG. 13B is a bottom view of the sensor housing of FIG. 13A.
Figure 13D:
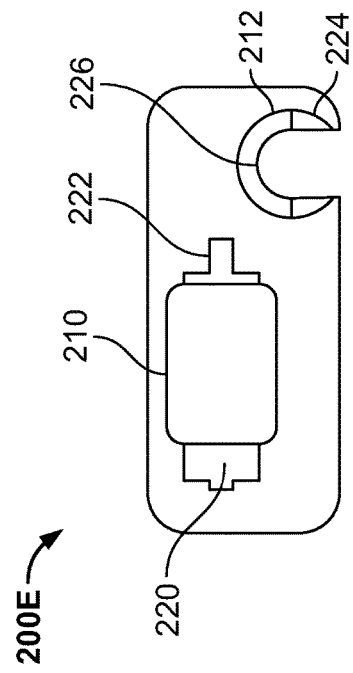
FIG. 13D is a front side view of the sensor housing of FIG. 13A.
Figure 13A:
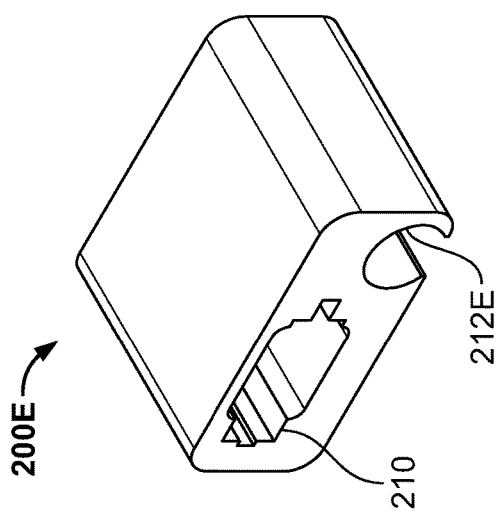
FIG. 13A is a perspective view of an another example sensor housing.
Figure 13C:
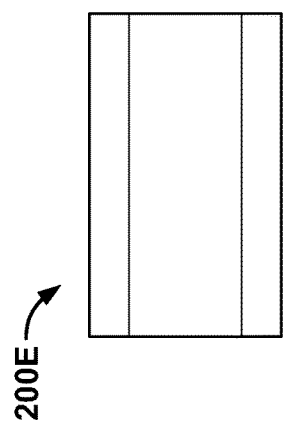
FIG. 13C is a right side view of the sensor housing of FIG. 13A.

Referring to FIGS. 4A-4F, another example of the mounting device 10C is illustrated having an example sensor housing 200C and an example mounting link 300. The example sensor housing 200C includes a single axially-aligned magnet 14 surrounded by a plurality of locking slots 222C (see FIG. 8A). The locking slots 222C interact with a locking protrusion 302 disposed on the mounting link 300 (see FIG. 9A) proximate an axially-aligned magnet 14. The axially-aligned magnets 14, 14 provide the force that holds the housing 200C and the mounting link 300 together. As illustrated, the housing 200C may be rotated so that the locking protrusion 302 fits into a desired locking slot 14, enabling the housing 200C to be disposed in four different positions relative to the mounting link 300 (see FIG. 8A). It will be appreciated by a person of ordinary skill in the art that the housing may include any desired number of locking slots in any desired arrangement to provide the housing with a desired set of possible arrangements.

Referring to FIGS. 10A-10B, another example of the mounting device 10D is illustrated. In this example, the device 10D includes the elongated band 11 of FIG. 2A. As illustrated, however, at least two of the links 12 are modified to include mounting foot recesses 402 configured in size and shape for coupling with mounting feet 400. In the illustrated example, each mounting foot 400 includes a rectangular base portion 404 and a trapezoidal upper portion 2006. The base portion 404 and upper portion 406 are made from a single body of material, in the example feet. As a result of the trapezoidal shape of the upper portion 406, two lateral angled flanges 408 extend from the upper portion 406.

The mounting foot recesses 402, shown in FIGS. 11A-11C, each also include a rectangular lower portion 410 and a trapezoidal upper portion 412. In lateral cross-section, each mounting foot recess 402 has a shape of two stacked rectangles. The trapezoidal upper portion 412 of each mounting foot recess 402 is similar in size and shape to the trapezoidal upper portion 406 of the mounting feet 400. The trapezoidal upper portion 412 of each mounting foot recess 402 narrows from an opening 414 to a back wall 416, such that a mounting foot 400 inserted into the mounting foot recess 402 experiences increasing friction as it is inserted.

In operation, the mounting feet 400 are slid into the mounting foot recesses 402. Lateral displacement of the feet 400 from the recesses 402 is prevented by friction fit between the trapezoidal upper portions 406, 412 of the mounting feet 400 and mounting feet recesses 402, and vertical displacement is prevented by the flanges 408 formed by the upper portions 406 of the mounting feet 400. The lower surface of the base portion 406 of each mounting foot 400 is coupled with a motor casing or other device or object with two-sided tape, adhesive, or other attachment means. If desired, the mounting device 10D may be removed for other use or replacement by sliding the mounting device 10D off of the mounting feet 400, which may stay coupled to the motor casing or other object or device.

The mounting feet 400 and associated recesses 402 in the mounting strap 10D enable simplified replacement of the strap 11, if desired. As a result, different mounting straps 10D (e.g., that support different sensors) may be used interchangeably on a single motor casing or other object or device, and a single mounting strap 10 may be moved from one motor casing to another with ease.

Referring to FIGS. 12A-12D, another example another example of the mounting device 10E is illustrated. In this example, the device 10E includes the elongated band 11 of FIG. 2A. As illustrated, however, at least one of the links 12 is modified to include an integrated sensor housing 200D. The integrated sensor housing 200D forms a unitary party of a link 12, and thus is integrated into the elongated band 11, in the illustrated embodiment. The integrated sensor housing 200D accepts one or more sensors. For example, the integrated sensor housing may accept a vibration sensor and/or pressure sensor. The integrated sensor housing 200D includes a cover 206D. In one embodiment, the cover 206D is translucent or transparent, so as to provide visual feedback from a sensor disposed within the integrated sensor housing 200D to a user. In another embodiment, the cover 206D is opaque. A sensor used with the integrated sensor housing 200D may include one or more visual indicators (e.g., LEDs or other lights).

The embodiment of the mounting device 10E illustrated in FIGS. 12A-12D advantageously provides a smaller profile and space requirement by virtue of the integration of the integrated sensor housing 200D into the elongated band 11. At the same time, the embodiment of FIG. 21 continues to provide the articulating functionality of other embodiments of this disclosure.

Referring to FIGS. 13A-13D, an example sensor housing 200E is illustrated. In this example, the sensor housing 200E defines a plurality of apertures 210, 212, each of which may be adapted to house one of a plurality of sensors (not shown), including for instance a temperature sensor, vibration sensor, or any other suitable sensor or monitoring device. In this example, the aperture 210 is particularly sized to house a vibration sensor, while the aperture 212 is sized to house a temperature sensor. A magnet 14 may be mounted in the housing 200E, such as for instance, in another aperture 216, defined in the housing 200E.

The example housing 200E allows both a vibration sensor and temperature sensor to be held in one concise package. Due to its small form factor and the magnet on its base, the housing 200E can be placed nearly anywhere on a motor. In one example, the housing 200E utilizes a press-fit or interference-fit to secure the vibration sensor, temperature sensor, and magnet in their respective apertures. In the illustrated example, the press-fit of the vibration sensor in the housing 200E is a substantially rigid connection such that the vibration sensor can accurately record acceleration data through the housing 200E. Furthermore, in this housing example, the bottom of the temperature sensor extends slightly past the bottom surface of the magnet such that the sensor is held in contact with the motor and able to record accurate measurements, while the magnet is still able to have a strong attraction to the motor.

A back plate 220 may be mounted proximate to the aperture 210 to prevent the vibration sensor from being over inserted. The aperture 210 may include a slot 222 to grip and retain the edges of the vibration sensor to better form a press-fit. Similarly, the example aperture 212 comprises a chamfered back plate 2226 to assist in the prevention of the temperature sensor from being over inserted. In addition, a channel 224 wraps around the aperture 212 to grip and retain the edges of the temperature sensor and to better form a press-fit. The temperature sensor may extend past the surface of the magnet 14 to assist in ensuring an accurate temperature measurement and an attraction of the magnet 14 to the motor.

Figure 14A:
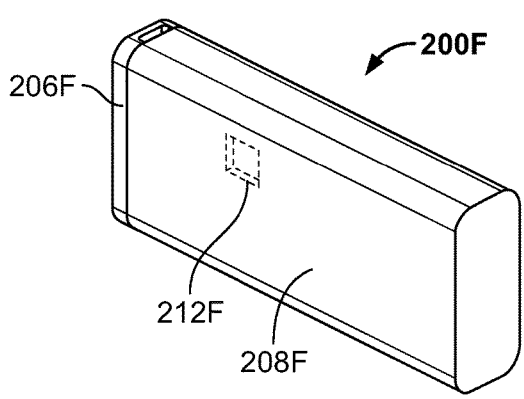
FIG. 14A is a perspective view of an another example sensor housing.
Figure 14B:
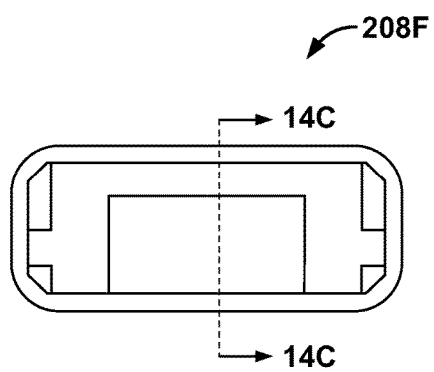
FIG. 14B is a front view of the body of the sensor housing of FIG. 14A.
Figure 14C:
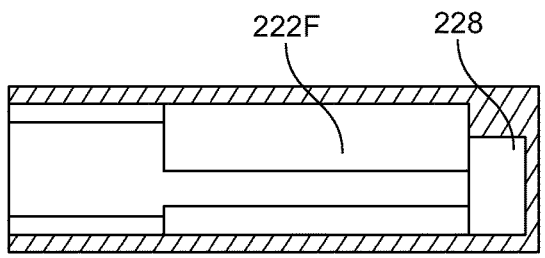
FIG. 14C is a cross-sectional view of the body of the sensor housing of FIG. 14A taken along.
Figure 14D:
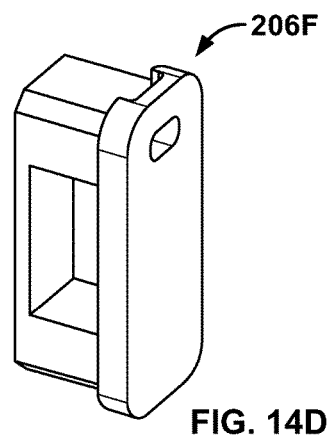
FIG. 14D is a perspective view of the cover of the sensor housing of FIG. 14A.

Referring to FIGS. 14A-D, an example sensor housing 200F is illustrated. The components including the body 208F and the end cap 2304 are shown in FIG. 14A. Housing body 2302 contains slots 210' to fit temperature and vibration sensors are shown in the cross-section of FIG. 14C taken across line 14C-14C. Additionally, FIG. 14C shows a slot 228 for magnet 14 to attach the housing body 200F to a motor or other device. The temperature sensor to protrude out of the bottom of the housing through an opening 222F so that it can make contact with the motor for a more accurate temperature reading. The end cap is shown in FIG. 14D.

Figure 15:
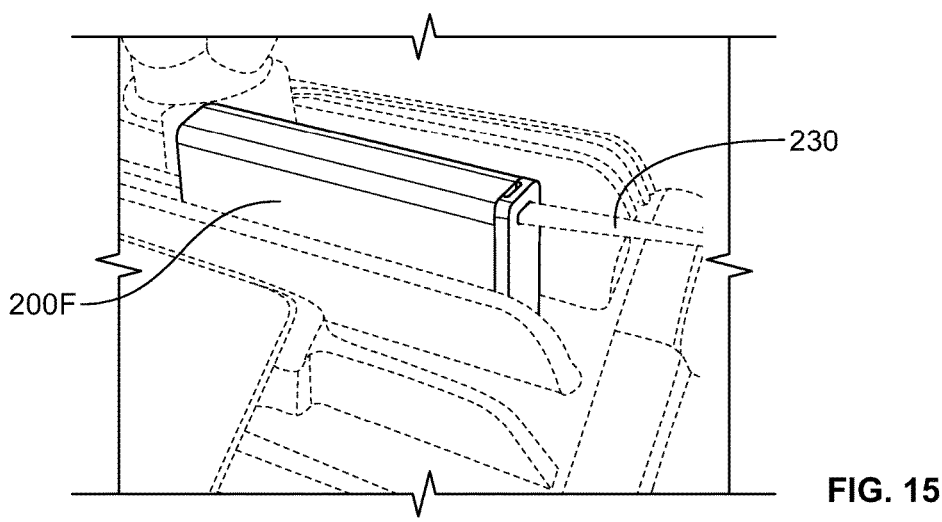
FIG. 15 is a view of the cap of the sensor housing shown in FIG. 14A
Figure 17B:
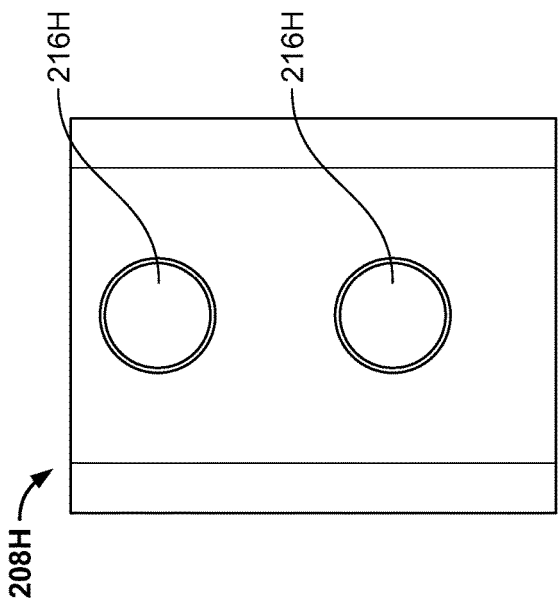
FIG. 17B is a bottom view of the body of the sensor housing of FIG. 17A.
Figure 17D:
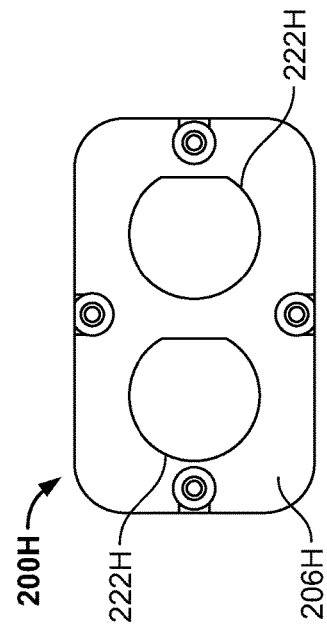
FIG. 17D is a front side view of the cover of the sensor housing of FIG. 17A.
Figure 17A:
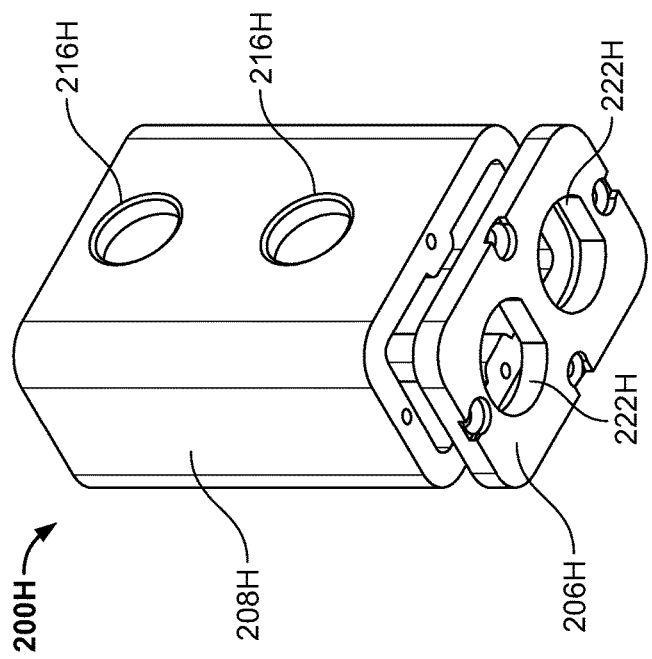
FIG. 17A is a perspective view of another example of the sensor housing.
Figure 17C:
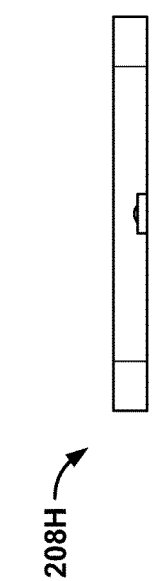
FIG. 17C is a bottom view of the cover of the sensor housing of FIG. 17A.

This sensor housing 200F is built with a very small profile in mind so that it can be placed both on smooth-surface motors and in between the fins of finned motors as shown in FIG. 15. The power cable 230, seen in FIG. 15, for the sensor package is permanently attached to the circuit board inside, which makes this sensor package a "one-piece" device.

As mentioned above, the housing 200F can be placed directly onto the motor. For example, the single piece device can be mounted onto the main body of the motor in order to measure the vibration and temperature centrally. In other situations, the housing 200F is placed in a junction box or in another protected area nearby. In some examples, the motor may have an integrated junction box—shielded from the elements, but built into the motor casing—from which the housing 200F and its sensors can measure the key variables such as temperature, vibration, and current. In this example, because there is already electrical equipment passing through the junction box, the housing 200F and its attendant sensors can be integrated into a single assembly as shown in FIG. 16A-D.

In the example shown in FIG. 16A, the housing 200F is similar to that shown in FIG. 14A. However, in this example, the housing 200F is equipped with sensor mounts 222G. Sensor mounts 222G can be used to fit sensors such as current sensors such as a Split Core Current Transformer ECS1030-LZ2 manufactured by Echun Electric Co. onto the housing 200F in order to make the package a single piece with all the sensors attached or built into the body of housing 200F. As mentioned above, other examples have sensors separately affixed to other locations. It is appreciated by one of ordinary skill in the art that other sensors could be mounted to sensor mounts 222G such as temperature, sonic, vibration, distance, thermal, strain gauges, etc.

In order to make housing 200F airtight and waterproof, epoxy can be used to fill up all the air space inside the housing body 208F and end cap 206F (not shown) to make it air-tight. Clear epoxy was chosen to make the LED light of the inside circuit visible to the user. One of ordinary skill could also use a gasket or other sealant between the parts of housing 200F such as the body 208F and the end cap 206F to waterproof it.

As shown in FIGS. 17A-18D, smart motor housings 200H can be made waterproof as well. A gasket 2601 (not shown) is positioned between end cap 206H and body 208H to allow a removable watertight seal. End cap 206H is attached to body 208H with fasteners or other connecting means inserted into holes 2606 as shown in FIG. 17D. Also shown in FIG. 17A, apertures 216H are sized to house magnets 14.

In the example shown in FIGS. 17A-D, end cap 206H has two coupler apertures 222H to allow power or data transmission. These apertures are usually fitted with waterproof electrical connections which can be used to link the printed circuit board inside the housing 216H to, for example, a temperature sensor. Further, the housing 216H can also contain sensors internally, such as, vibration sensors. In another example of smart motor housing 200I, shown in FIGS. 18A-D, one coupler aperture 222I is placed at each end of the smart motor housing 200I, thereby placing one aperture 222I in end cap 206I and another on the opposite side of housing 200I in body 208I.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents.

We claim:

1. A sensor mounting device comprising:
a protective body containing a microcontroller fixed to the body including a memory and a transceiver;
at least one sensor operably coupled to the microcontroller wherein the microcontroller monitors operating data from the at least one sensor regarding a motor; and
a multipart attachment mount for mounting at least part of the sensor mounting device onto the motor, the multipart attachment mount comprising:
  a center link with an attachment for affixing the sensor to the attachment mount;
  a plurality of end links with an attachment for affixing the attachment mount to the motor; and
  at least one interstitial link positioned between and rotably connected to each of the center link and the end links;
wherein the microcontroller is capable of:
  storing a set of current operating data in the memory;
  comparing the set of current operating data to a set of previously collected operating data from this device or a baseline set of operating data stored in the memory provided; and
  executing a preset command when the comparison has been reached anomalous or threshold levels.

2. The sensor mounting device of claim 1, wherein the preset command is the microcontroller notifying a user when the operating data of the motor passes a predefined threshold.

3. The sensor mounting device of claim 1, wherein the preset command is the microcontroller signaling for the motor to be turned off.

4. The sensor mounting device of claim 1, wherein the attachment means further comprises a strap.

5. The sensor mounting device of claim 4, wherein the body, the at least one sensor, and the microcontroller are woven into the strap.

6. The sensor mounting device of claim 1, wherein the sensor is substantially contained within the protective body.

7. The sensor mounting device of claim 1, wherein the protective body is watertight.

8. The sensor mounting device of claim 1, wherein the at least one sensor is at least one of a thermal, vibrational, sonic, voltage, or current sensor.

9. The sensor mounting device of claim 1, wherein the at least one sensor is modular and interchangeable.

10. The sensor mounting device of claim 1, wherein the attachment means is a magnet.

* * * * *